United States Patent [19]

Hart

[11] 3,903,259

[45] Sept. 2, 1975

[54] METHOD OF DEODORIZING DIAPERS AND HUMAN EXCRETA

[76] Inventor: Una L. Hart, 1750 Summit Ave., St. Paul, Minn. 55105

[22] Filed: Oct. 29, 1973

[21] Appl. No.: 410,241

Related U.S. Application Data

[63] Continuation-in-part of Ser. No. 104,769, Jan. 7, 1971, abandoned, which is a continuation-in-part of Ser. No. 782,474, Dec. 9, 1968, abandoned.

[52] U.S. Cl. .................................................. 424/76
[51] Int. Cl.² ........................................ A61C 13/00
[58] Field of Search ....................................... 424/76

[56] References Cited
UNITED STATES PATENTS

| | | | |
|---|---|---|---|
| 1,936,845 | 11/1933 | Lautmann | 424/69 |
| 2,501,927 | 3/1950 | Block | 424/79 |
| 2,838,440 | 6/1958 | Thurmon | 424/79 |
| 2,919,230 | 12/1959 | Thurmon | 424/79 |
| 3,133,866 | 5/1964 | Richardson | 424/69 |
| 3,141,821 | 7/1964 | Compeau | 424/69 |
| 3,152,039 | 10/1964 | Mattson | 424/79 |
| 3,326,808 | 6/1967 | Noseworthy | 252/106 |

*Primary Examiner*—Albert T. Meyers
*Assistant Examiner*—Norman A. Drezin

[57] ABSTRACT

A method of deodorizing diapers and human excreta is provided which comprises applying to the diapers or the excreta a chemical composition which in its simpliest form consists of an acidic material, an antibacterial material, and a solvent. The impregnating composition may also contain a chelating agent and a wetting agent. The exact nature of the acids, antibacterial agents, solvents, chelating agents, and wetting agents is described. The treatment of diapers results in a marked decrease in offensive odors from excreta, thus making the changing of soiled diapers less unpleasant.

4 Claims, No Drawings

METHOD OF DEODORIZING DIAPERS AND HUMAN EXCRETA

This is a continuation-in-part of my previous application Ser. No. 104,769 filed Jan. 7, 1971, and which in turn is a continuation-in-part of my previous application filed Dec. 9, 1968, Ser. No. 782,474, both abandoned.

This invention relates to an improvement in method of deodorizing soiled diapers and deals particularly in the treatment of soiled diapers and human excreta to decrease the offensive odors from excreta, thus making the changing of soiled diapers less unpleasant.

BACKGROUND OF THE INVENTION

One of the common pathological conditions of a baby's skin is "ammonia dermatitis" or diaper rash. It is described in the medical literature as being "characterized by an erythematous, vesicular or ulcerated eruption in the diaper area caused by the liberation of ammonia from urine by urea splitting organisms." (Laurence B. Slobody, M.D., *Clinical Pediatrics*, McGraw Hill, New York, 1955, p.428). The urea splitting organisms are some 200 species of bacteria which contain the enzyme urease. (James B. Summer and G. Fred Somers, *The Chemistry and Methods of Enzymes*, 3rd, Ed., Academic Press, New York, 1953, p.156). This enzyme catalizes with splitting of urea, which is non-irritating to the skin, to ammonia which is a skin irritant because it is strongly alkaline, i.e., it has a pH considerably above 7 and thus causes a chemical irritation of the skin.

Similarly, there can be irritation by alkaline residues left in improperly rinsed diapers. In the common household laundry detergents alkaline compounds such as sodium triphosphate, polyphosphate, carbonate and metasilicate are present. When the diaper is washed using a product containing one or more of these compounds and inadequately rinsed, these materials are left in the diaper. When such a diaper is moistened by perspiration or by urine, these compounds dissolve to produce an alkaline solution which irritates the baby's skin.

One of the objectional odors from soiled diapers is ammonia which is produced from urea in urine by bacteria often present in diapers. A feature of the present invention resides in applying to the soiled diaper and to excreta a hypertonic solution including a weak organic acid which will not irritate the skin, and preferably one which is odorless. Certain acid salts could be used, preferably salts of strong acids and weak bases.

A further feature of the present invention relates to the provision of a method for the purpose described in which the hypertonic solution used in the method includes an effective antibacterial agent so that the growth of bacteria will be inhibited, thereby limiting the production of ammonia in badly contaminated diapers. The antibacterial agent is necessary to prevent the formation of large amounts of ammonia and the subsequent neutralization of all the mild acid present in the treating solution, there being a limit to the amount of mild acid which may be used.

An added feature of the present invention is to provide a method of the type described in which the hypertonic treating composition includes a chelating agent. Such an agent provides an aid to bacteriostasis. Although the chelating agents used do not function effectively in acid solution, they increase in effectiveness as the pH increases.

A further feature of the present invention lies in the provision of a wetting agent in the treating solution. The wetting agent permits the spray to penetrate the diaper and to evenly distribute the product on the diaper. As a result, the spray may be applied to the diapers in small amounts and still be effective.

These and other objects and novel features of the present invention will be more clearly and fully set forth in the following specification and claims.

The first ingredient of the treating solution is acid. While a strong mineral acid such as hydrochloric or sulfuric acid would neutralize alkaline compounds, such acids should be avoided because they themselves are skin irritants. Lower molecular weight aliphatic acids could also be used, but they have odors which make them less desirable. The acid should preferably be organic or weak inorganic acid such as citric acid, malic acid, tartaric acid, succinic acid, mandelic acid, fumaric acid, benzoic acid, lauric acid, stearic acid, sodium dihydrogen phosphate and ammonium sulfate. The amount of the organic acid will vary. The very water soluble acids such as citric, malic and tartaric are to be used in a concentration by weight of 5–10%; the moderately soluble acids such as succinic and mandelic acids in a concentration by weight of 5–20%, and the slightly soluble acids such as benzoic, fumaric, lauric and stearic acids in a concentration by weight of 10–50%. The concentration of weight of the acidic salts is to be between 5–20%.

The acids may be used singly or in combinations. For example, a very soluble or moderately soluble acid may be combined with a slightly soluble one so that there will be reserve acidity. The water soluble acids should be used in the concentrations ranges previously defined and the slightly soluble one in such an amount that the total concentration of acid is between 25–50% by weight.

The amount of acid which may be used is quite naturally limited. As has been indicated, the acid must be weak, and if in an aqueous medium, should not be applied to the diaper in sufficient quantity to wet it. Thus, while the acid in the product may be sufficient to neutralize the residual alkaline compounds in the diapers resulting from incomplete removal of laundry agents, it may not be present in sufficient quantity to neutralize all the ammonia produced by bacteria in badly contaminated diapers. To counteract this bacterial action, it is necessary to kill the ammonia producing bacteria or at least to inhibit their growth. Therefore, an effective antibacterial agent is incorporated in the spray.

As examples of antibacterial agents which are used the following may be listed: Hexachlorophene, 6-acetoxy-2,4-dimethyl-m-dioxane, formaldehyde, thymol and phenethyl alcohol (B). More than one antibacterial agent may be used, provided that they are compatible.

As an aid to stain removal and to antibacterial action, chelating agents such as ethylenediaminetetraacetic acid, diethylenetriaminepentaacetic acid and their sodium salts may be added. Chelating agents such as the type described above generally do not function efficiently in acidic solution, but as the pH rises, they will become effective.

The addition of a wetting agent improves the hypertonic treating solution which is designed to be sprayed on the diaper in small amounts. Obviously the amount of solution should be small or the diaper will be wet. The purpose of the surfactant, then, is to insure the even distribution of spray on the diaper by reducing the surface tension of the liquid. Useful surfactants are nonylphenoxypoly (2–12) ethyleneoxyethanol, benzene alkyl ($C_4$–$C_{15}$) sulfonate and sodium dioctyl sulfosuccinate.

Suitable solvents are water, ethanol, isopropanol, and mixtures of these. In the case of the latter two, they will also exert an antibacterial action.

The following solutions and suspensions illustrate the treating solutions. The solutions are simply prepared by dissolving the solutes in the solvent, the suspensions are prepared by mixing the ingredients and milling as required in a colloid mill. These solutions and suspensions are to be used on soiled diapers; and excreta, spraying is a convenient method to use.

EXAMPLES 1.  5 g. Citric acid
    0.5 g. 6-Acetoxy 2,4-dimethyl m-dioxane
    94.5 g. Water
2.  8 g. Malic acid
    1 g. 3,4'5-Tribromosalicylanilide
    91 g. 95% Ethanol
3.  15 g. Mandelic acid
    2 g. 6-Acetoxy 2,4-dimethyl m-dioxane
    2 g. Phenethyl alcohol (B)
    81 g. 95% ethanol
4.  15 g. Lauric acid
    0.5 g. Trioxane
    1 g. 4,3',4'-Trichlorosalicylanilide
    5 g. Glycerol monostearate
    8 g. Polyoxyethylene (20) sorbitan monostearate
    70.5 g. Water
5.  5 g. Mandelic acid
    1. g. Hexachlorophene
    10 g. Polyoxyethylene (20) sorbitan monostearate
    84 g. Water
6.  50 g. Lauric acid
    1 g. 3,4',5-Tribromosalicylanilide
    5 g. Sorbitan trioleate
    4 g. Polyoxyethylene (20) sorbitan monostearate
    40 g. Water
7.  5 g. Sodium dihydrogen phosphate
    1 g. 6-Acetoxy 2,4-dimethyle m-dioxane
    94 g. Water
8.  10 g. Citric acid
    0.5 g. 6-Acetoxy-2,4-dimethyl-m-dioxane
    1 g. Disodium salt of ethylenediaminetetraacetic Acid
    88.5 g. Water
9.  5 g. Malic acid
    5 g. 40% Formalin solution
    4 g. Tetrasodium ethylenediaminetetraacetate
    86 g. Water
10. 5 g. Succinic acid
    3 g. 6-Acetoxy-2,4-dimethyl-m-dioxane
    1 g. Disodium salt of ethylenediaminetetraacetic acid
    91 g. Water
11. 15 g. Mandelic acid
    5 g. 3,4',5-Tribromosalicylanilide
    2 g. Nonylphenoxypoly (2–12) ethyleneoxyethanol
    78 g. isopropanol
12. 5 g. Tartaric acid
    2 g. Bithionol
    2 g. Hexachlorophene
    0.5 g. Nonylphenoxypoly (2–12) ethyleneoxyethanol
    90.5 g. 95% ethanol
13. 10 g. Benzoic acid
    1 g. Hexachlorophene
    0.5 g. Trioxane
    0.5 g. Nonylphenoxypoly (2–12) ethyleneoxyethanol
    88 g. Isopropanol
14. 5 g. Citric acid
    2 g. 6-Acetoxy-2,4-dimethyle-m-dioxane
    5 g. Disodium salt of ethylenediaminetetraacetic acid
    2 g. Sodium dioctyl sulfosuccinate
    86 g. Water
15. 10 g. Tartaric acid
    3 g. 3,4',5-Tribromosalicylanilide
    3 g. Diethylene triaminepentaacetic acid
    2 g. Nonylphenoxypoly (2–12) ethyleneoxyethanol
    20 g. Starch
    62 g. Talc
16. 10 g. Mandelic acid
    2 g. 4,3',4'-Trichlorosalicylanilide
    1 g. Pentasodium diethylenetriaminepentaacetate
    3 g. Polyoxyethylene (20) sorbitan monostearate
    2 g. Glycerol monostearate
    0.5 g. Benzene alkyl ($C_4$–$C_{15}$) sulfonate
    81.5 g. Water
17. 20 g. Succinic acid
    2 g. Hexachlorophene
    3 g. Thymol
    2 g. Ethylenediaminetetraacetic acid
    15 g. Kaolin
    58 g. Talc
18. 15 g. Lauric acid
    5. g. Phenethyl alcohol (B)
    0.5 g. Diethylenetriaminepentaacetic acid
    5 g. Polyoxyethylene (20) sorbitan monostearate
    5 g. Glycerol monostearate
    69.5 g. 95% ethanol
19. 5 g. Tartaric acid
    15 g. Stearic acid
    2 g. 3,4',5-Tribromosalicylanilide
    5 g. Tetraethyleneglycol monostearate
    2 g. Polyoxyethylene (20) sorbitan monostearate
    71 g. Water
20. 15 g. Mandelic acid
    25 g. Benzoic acid
    1 g. 6-Acetoxy-2,4-dimethyle-m-dioxane
    1 g. Nonylphenoxypoly (2–12) ethyleneoxyethanol
    58 g. Isopropanol Emulsifying agents such as glycerol monostearate, tetraethylene glycol monostearate, polyoxyethylene (20) sorbitan monostearate, and soritan trioleate may also be added to stabilize aqueous suspensions of insoluble acids and antibacterial agents. They may be used singly or in pairs.

A perfume may be added, but this is an optional ingredient.

I claim:

1. A method of deodorizing soiled diapers which comprises applying thereto a deodorizing amount of a hypertonic solution consisting essentially of (1) 5 to 50% by weight of an acidic material or mixture thereof, said acidic material being selected from the Group consisting of 5 to 15% by weight of Group A, 5 to 20% by weight of Group B, 10 to 50% by weight of Group C and 5 to 20% by weight of Group D wherein Group A is an organic acid selected from the Group consisting of citric, malic and tartaric acid; Group B is an organic acid selected from the group consisting of succinic and mandelic acid; Group C is an organic acid selected from the group consisting of benzoic, fumaric, lauric and stearic acid and Group D is an acidic salt selected from the group consisting of sodium dihydrogen phosphate and ammonium sulfate; (2) 0.5 to 5% by weight of an antibacterial agent slected from the group consisting of hexachlorophene, 4,3',4'-trichlorosalicylanilide, 3,4'-5-tribromosalicylanilide, 6-acetoxy 2,4-dimethyl m-dioxane, bithionol, formaldehyde, thymol and phenethyl alcohol (B) and (3) a diluent selected from the group consisting of water, ethanol, and isopropanol.

2. The method of claim 1 wherein said solution further includes 0.5 to 5% of a chelating agent selected from the group consisting of ethylenediaminetetraacetic acid, diethylenetriaminepentaacetic acid and the sodium salt thereof.

3. The method of claim 1 wherein said solution further includes 0.5 to 2% by weight of a wetting agent selected from the group consisting of nonylphenolpolyethyleneoxy ethanol having 2 to 12 moles of ethylene oxide, benzene alkyl sulfonate wherein said alkyl has from 4 to 15 carbon atoms and sodium dioctyl sulfosuccinate.

4. A method of deodorizing human excreta which comprises applying to said excreta a deodorizing amount of a hypertonic solution consisting essentially of (1) 5 to 50% by weight of an acidic material or mixture thereof, said acidic material being selected from the Group consisting of 5 to 15% by weight of Group A, 5 to 20% by weight of Group B, 10 to 50% by weight of Group C and 5 to 20% by weight of Group D wherein Group A is an organic acid selected from the Group consisting of citric, malic and tartaric acid; Group B is an organic acid selected from the group consisting of succinic and mandelic acid; Group C is an organic acid selected from the group consisting of benzoic, fumaric, lauric and stearic acid; and Group D is an acidic salt selected from the group consisting of sodium dihydrogen phosphate and ammonium sulfate; (2) 0.5 to 5% by weight of an antibacterial agent selected from the group consisting of hexachlorophene, 4,3',4' trichlorosalicylanilide, 3,4', 5-tribromosalicylanilide, 6-acetoxy-2,4-dimethyl-m-dioxane, bithionol, formaldehyde, thymol and phenethyl alcohol B and (3) a diluent selected from the group consisting of water, ethanol, and isopropanol.

* * * * *